US011290491B2

(12) United States Patent
Liu et al.

(10) Patent No.: US 11,290,491 B2
(45) Date of Patent: Mar. 29, 2022

(54) METHODS, SYSTEMS, AND COMPUTER READABLE MEDIA FOR UTILIZING A SECURITY SERVICE ENGINE TO ASSESS SECURITY VULNERABILITIES ON A SECURITY GATEWAY ELEMENT

(71) Applicant: Oracle International Corporation, Redwood Shores, CA (US)

(72) Inventors: Cheng Liu, Acton, MA (US); Ge Guo, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 291 days.

(21) Appl. No.: 16/354,121

(22) Filed: Mar. 14, 2019

(65) Prior Publication Data
US 2020/0296136 A1 Sep. 17, 2020

(51) Int. Cl.
*H04L 29/06* (2006.01)
*H04L 12/46* (2006.01)
(Continued)

(52) U.S. Cl.
CPC .......... *H04L 63/20* (2013.01); *H04L 12/4641* (2013.01); *H04L 12/66* (2013.01);
(Continued)

(58) Field of Classification Search
CPC . H04L 63/20; H04L 12/4641; H04L 63/1416; H04L 63/0209; H04L 63/1433;
(Continued)

(56) References Cited

U.S. PATENT DOCUMENTS 5,991,879 A 11/1999 Still
6,473,400 B1 10/2002 Manning
(Continued)

FOREIGN PATENT DOCUMENTS

CA 2929304 A1 * 5/2015 ......... H04L 41/0893
CN 101227289 A * 7/2008 ......... H04L 63/1441
(Continued)

OTHER PUBLICATIONS

Barrere, "Vulnerability Management for Safe Configurations in Autonomic Networks and Systems", 2014 (Year: 2014).*
(Continued)

*Primary Examiner* — Ondrej C Vostal
(74) *Attorney, Agent, or Firm* — Jenkins, Wilson, Taylor & Hunt, P.A.

(57) ABSTRACT

A method for utilizing a security service engine (SSE) to assess security vulnerabilities on a security gateway element (SGE) includes establishing a security configuration for a SGE corresponding to a provisioned security service policy definition and configuring a plurality of SGE security service managers hosted by a SSE on the SGE based on policies included in the security service policy definition. The method further includes executing, by the SSE, each of the plurality of SGE security service managers as a software based service in real time to enforce the policies of the security service policy definition on the SGE and remediating the security configuration of the SGE if one or more of the plurality of SGE security service managers detects a security vulnerability corresponding to the operation of the SGE.

20 Claims, 8 Drawing Sheets

(51) Int. Cl.
*H04L 12/66* (2006.01)
*H04L 41/50* (2022.01)

(52) U.S. Cl.
CPC ...... *H04L 41/5032* (2013.01); *H04L 63/0209* (2013.01); *H04L 63/1433* (2013.01)

(58) Field of Classification Search
CPC ......... H04L 63/1491; H04L 2012/5687; H04L 29/06551; H04L 29/06986; H04L 41/28; H04L 63/00; H04L 63/107; G06F 11/00; G06F 21/50; G06F 21/57; G06F 21/577; G06Q 10/06; G06Q 20/206; G06Q 50/265; G06G 11/0793; H04W 76/11; H04W 12/00; H04W 12/30; H04W 12/37; H04W 12/40
See application file for complete search history.

(56) References Cited

U.S. PATENT DOCUMENTS

| | | | |
|---|---|---|---|
| 6,760,775 B1 | 7/2004 | Anerousis et al. | |
| 6,781,990 B1 | 8/2004 | Puri et al. | |
| 7,000,247 B2* | 2/2006 | Banzhof | G06F 21/577 726/2 |
| 7,472,422 B1* | 12/2008 | Agbabian | H04L 41/06 726/25 |
| 7,735,116 B1* | 6/2010 | Gauvin | G06F 21/552 726/2 |
| 8,135,823 B2* | 3/2012 | Cole | G02B 6/12023 709/224 |
| 8,553,634 B2* | 10/2013 | Chun | H04L 5/0007 370/329 |
| 8,813,225 B1* | 8/2014 | Fuller | H04L 67/16 726/23 |
| 9,117,069 B2* | 8/2015 | Oliphant | G06F 21/50 |
| 9,325,728 B1* | 4/2016 | Kennedy | H04L 63/1433 |
| 9,608,997 B2* | 3/2017 | Nicodemus | G06F 21/55 |
| 9,973,540 B2* | 5/2018 | Li | H04L 63/1425 |
| 10,075,466 B1* | 9/2018 | Oliphant | H04L 63/1416 |
| 10,225,288 B2* | 3/2019 | Haugsnes | H04L 63/0281 |
| 10,454,963 B1* | 10/2019 | Smith | H04L 63/1425 |
| 10,484,331 B1* | 11/2019 | Rossman | H04L 63/1491 |
| 10,567,413 B2 | 2/2020 | Ahn et al. | |
| 2003/0069958 A1* | 4/2003 | Jalava | H04L 12/4641 709/223 |
| 2004/0003087 A1* | 1/2004 | Chambliss | H04L 41/083 709/226 |
| 2004/0004941 A1* | 1/2004 | Malan | H04L 41/22 370/254 |
| 2004/0025173 A1 | 2/2004 | Levonai et al. | |
| 2004/0054925 A1* | 3/2004 | Etheridge | H04L 63/1458 726/22 |
| 2005/0119905 A1 | 6/2005 | Wong et al. | |
| 2005/0154979 A1 | 7/2005 | Chidlovskii et al. | |
| 2005/0198099 A1 | 9/2005 | Motsinger et al. | |
| 2006/0242695 A1* | 10/2006 | Nedeltchev | H04L 63/20 726/15 |
| 2007/0143851 A1* | 6/2007 | Nicodemus | G06F 21/577 726/25 |
| 2008/0151779 A1 | 6/2008 | Johnson et al. | |
| 2008/0219239 A1* | 9/2008 | Bell | H02J 13/00017 370/351 |
| 2009/0024663 A1 | 1/2009 | McGovern | |
| 2009/0116573 A1 | 5/2009 | Gaal et al. | |
| 2009/0119776 A1* | 5/2009 | Palnitkar | H04W 12/126 726/25 |
| 2009/0154367 A1* | 6/2009 | Aaron | H04W 64/006 370/252 |
| 2010/0020688 A1* | 1/2010 | Spatscheck | H04L 47/32 370/235 |
| 2010/0029626 A1* | 2/2010 | Bold | C07D 413/12 514/227.8 |
| 2010/0071035 A1 | 3/2010 | Budko et al. | |
| 2010/0306408 A1* | 12/2010 | Greenberg | H04L 12/4633 709/238 |
| 2011/0080897 A1* | 4/2011 | Hernandez | H04L 47/781 370/338 |
| 2012/0246730 A1* | 9/2012 | Raad | H04L 61/1552 726/25 |
| 2012/0304277 A1* | 11/2012 | Li | H04L 63/0281 726/12 |
| 2013/0034022 A1 | 2/2013 | Yen et al. | |
| 2013/0254375 A1* | 9/2013 | Agiwal | H04L 67/1002 709/224 |
| 2013/0294230 A1* | 11/2013 | Popa | H04L 47/743 370/230 |
| 2013/0294284 A1* | 11/2013 | Popa | H04W 12/06 370/254 |
| 2013/0298230 A1* | 11/2013 | Kumar | H04L 63/1425 726/22 |
| 2014/0082169 A1* | 3/2014 | Shinde | H04L 12/1407 709/223 |
| 2014/0281548 A1* | 9/2014 | Boyer | H04L 63/10 713/171 |
| 2015/0040231 A1 | 2/2015 | Oliphant et al. | |
| 2015/0040321 A1* | 2/2015 | Moore | A47G 9/109 5/636 |
| 2015/0135209 A1* | 5/2015 | LaBosco | H04N 21/43635 725/31 |
| 2016/0014159 A1* | 1/2016 | Schrecker | H04L 63/105 726/1 |
| 2016/0182329 A1* | 6/2016 | Armolavicius | H04L 41/0893 370/230 |
| 2016/0219048 A1* | 7/2016 | Porras | H04L 41/147 |
| 2017/0026231 A1* | 1/2017 | Poosala | H04L 41/0803 |
| 2017/0286689 A1* | 10/2017 | Kelley | G06F 21/577 |
| 2018/0084081 A1* | 3/2018 | Kuchibhotla | H04L 67/1097 |
| 2018/0324203 A1* | 11/2018 | Estes | G06F 9/45558 |
| 2018/0332069 A1* | 11/2018 | Moore | G06F 21/105 |
| 2018/0351970 A1* | 12/2018 | Majumder | H04L 63/061 |
| 2018/0352004 A1 | 12/2018 | Leung et al. | |
| 2019/0035027 A1 | 1/2019 | Ng et al. | |
| 2019/0236062 A1* | 8/2019 | Proctor | G06F 16/27 |
| 2019/0342323 A1* | 11/2019 | Henderson | G06F 16/285 |
| 2020/0159933 A1* | 5/2020 | Ciano | G06F 21/577 |
| 2020/0228560 A1* | 7/2020 | Murthy | G06F 21/577 |
| 2020/0244517 A1* | 7/2020 | Prasad | H04W 76/10 |
| 2020/0274902 A1 | 8/2020 | Gopal et al. | |
| 2021/0141351 A1 | 5/2021 | Yang et al. | |

FOREIGN PATENT DOCUMENTS

| | | | | |
|---|---|---|---|---|
| JP | 6266696 B2 * | 1/2018 | | H04L 63/20 |
| JP | 2018170803 A * | 11/2018 | | H04L 43/0882 |
| WO | WO 2011/0115856 A2 | 9/2011 | | |
| WO | WO-2018183313 A1 * | 10/2018 | | H04L 67/30 |
| WO | WO 2020/176174 A1 | 9/2020 | | |

OTHER PUBLICATIONS

Laurie, "Managed Vulnerability Assessment (MVA)—Improve Security By Understanding Your Own Vulnerabilities!", 2002 (Year: 2002).*

Liu et al., "A Practical Vulnerability Assessment Program", 2007 (Year: 2007).*

Ahmad et al., "Security in Software defined networks: A Survey", 2015 (Year: 2015).*

Akkaya et al., "Sink repositioning for enhanced performance in wireless sensor networks", 2005 (Year: 2005).*

Andelman et al., "Competitive Management of Non-preemptive Queues with Multiple Values", 2003 (Year: 2003).*

Argyraki et al., "Scalable Network-Layer Defense Against Internet Bandwidth-Flooding Attacks", 2009 (Year: 2009).*

Curnyn, "Optimization of a heterogeneous virtual wireless network", WO 2003028313 A2, 2003 (Year: 2003).*

Jin et al., "Network Architecture and QoS Issues in the Internet of Things for a Smart City", 2012 (Year: 2012).*

Kreutz et al., "Software-Defined Networking: A Comprehensive Survey", 2014 (Year: 2014).*

(56) References Cited

OTHER PUBLICATIONS

Kumar et al., "Intrusion Detection System for Grid Computing using SNORT", 2012 (Year: 2012).*
Mankin, "Gateway congestion control survey", RFC 1254, 1991 (Year: 1991).*
Merriam-Webster, "remedy", 2021 (Year: 2021).*
Microsoft Computer Dictionary, "real time", p. 144, 2002 (Year: 2002).*
Oueslati et al., "A new direction for quality of service: Flow-aware networking", 2005 (Year: 2005).*
Yang et al., "Admission Control of Integrated Voice/Data Traffic for Networks of Leo Satellites Using CDMA", 1994 (Year: 1994).*
Non-Final Office Action for U.S. Appl. No. 16/286,508 (dated Nov. 27, 2020).
Notification of Transmittal of the International Search Report and the Written Opinion of the International Searching Authority, or the Declaration for International Application Serial No. PCT/US2020/021898 (dated Jun. 16, 2020).
Notification of Transmittal of the International Search Report and the Written Opinion of the International Searching Authority, or the Declaration for International Application Serial No. PCT/US2020/014017 (dated Apr. 23, 2020).
Commonly-Assigned, co-pending U.S. Appl. No. 16/286,508 for "Methods, Systems, and Computer Readable Media for Dynamically Remediating a Security System Entity," (Unpublished, filed Feb. 26, 2019).
Notice of Allowance and Fee(s) Due for U.S. Appl. No. 16/286,508 (May 19, 2021).
Applicant-Initiated Interview Summary for U.S. Appl. No. 16/286,508 (Mar. 15, 2021).

\* cited by examiner

METHODS, SYSTEMS, AND COMPUTER READABLE MEDIA FOR UTILIZING A SECURITY SERVICE ENGINE TO ASSESS SECURITY VULNERABILITIES ON A SECURITY GATEWAY ELEMENT

TECHNICAL FIELD

The subject matter described herein relates to implementing security intelligence into a security gateway element (SGE) to provide network monitoring and remediation services at the SGE. More particularly, the subject matter described herein relates to methods, systems, and computer readable media for utilizing a security service engine to assess security vulnerabilities on a security gateway element.

BACKGROUND

A security gateway element, such as a session border controller, is a network element that is deployed in a communications network and configured to manage and regulate internet protocol communication traffic flows. The security gateway element is usually deployed at the border of the communication network, such as an enterprise network, in order to control the internet protocol (IP) communication sessions that traverse the security gateway element. A security gateway element can be configured to provide protection against denial-of-service attacks, safeguard against toll fraud and service theft, provide protection against malicious packet traffic, and encrypt signaling messages and media traffic messages. To implement these security features, the security gateway element traditionally needs to be subjected to a secure configuration, third-party software management, and real-time network traffic control. At present, a secure configuration is commonly achieved by providing a security configuration guide to a system administrator. However, such an approach in no way guarantees that the security gateway element is actually configured in a secure manner. Likewise, the general approach to third-party software management is to manually check each software component present in the security gateway element and ensure that there are no existing security vulnerabilities. However, such manual security checks are extremely time consuming and resource intensive. Moreover, while the dynamic traffic flow control of the security gateway element can be managed by parameters from a provisioned security configuration, such an approach provides an unsuitable mechanism capable to adapting to actual network traffic flow conditions in real time.

Accordingly, there exists a need for methods, systems, and computer readable media for utilizing a security service engine to assess security vulnerabilities on a security gateway element.

SUMMARY

The subject matter described herein includes a methods, systems, and computer readable media for utilizing a security service engine (SSE) to assess security vulnerabilities on a security gateway element (SGE). One method includes establishing a security configuration for a SGE corresponding to a provisioned security service policy definition and configuring a plurality of SGE security service managers hosted by a SSE on the SGE based on policies included in the security service policy definition. The method further includes executing, by the SSE, each of the plurality of SGE security service managers as a software based service in real time to enforce the policies of the security service policy definition on the SGE and remediating the security configuration of the SGE if one or more of the plurality of SGE security service managers detects a security vulnerability corresponding to the operation of the SGE.

In one example of the method, the SGE includes a session border controller (SBC), a firewall, a Web service gateway, or a virtual private network (VPN) server.

In one example of the method, one of the plurality of SGE security service managers includes a SGE component security manager that is configured facilitate a security service that assesses security vulnerabilities of the SGE based on hardware component information and software component information obtained from the SGE.

In one example of the method, one of the plurality of SGE security service managers includes a network security status manager that is configured to facilitate a security service that assesses security vulnerabilities of management ports and service ports of the SGE.

In one example of the method, one of the plurality of SGE security service managers includes a SGE security configuration manager that is configured to facilitate a security service that assesses security vulnerabilities of the SGE based on a current security configuration of the SGE.

In one example of the method, one of the plurality of SGE security service managers includes a network traffic security analysis manager that is configured to facilitate a security service that assesses security vulnerabilities of the SGE based on an analysis of incoming and outgoing network traffic traversing via the SGE.

In one example of the method, one of the plurality of SGE security service managers includes an analytics security service manager that is configured to facilitate a security service that assesses security vulnerabilities of the SGE through systematic analysis of data and statistics collected from the SGE under operation.

A system for utilizing a security service engine to assess security vulnerabilities on a security gateway element includes a session gateway element comprising at least one processor and memory. The system further includes a security service engine stored in the memory and when executed by the at least one processor is configured to establish a security configuration for the SGE corresponding to a provisioned security service policy definition, to configure a plurality of SGE security service managers hosted by the SSE based on policies included in the security service policy definition, to execute each of the plurality of SGE security service managers as a software based service in real time to enforce the policies of the security service policy definition on the SGE, and to remediate the security configuration of the SGE if one or more of the plurality of SGE security service managers detects a security vulnerability corresponding to the operation of the SGE.

In one example of the system, the SGE includes a session border controller, a firewall, a Web service gateway, or a virtual private network server.

In one example of the system, one of the plurality of SGE security service managers includes a SGE component security manager that is configured facilitate a security service that assesses security vulnerabilities of the SGE based on hardware component information and software component information obtained from the SGE.

In one example of the system, one of the plurality of SGE security service managers includes a network security status manager that is configured to facilitate a security service that assesses security vulnerabilities of management ports and service ports of the SGE.

In one example of the system, one of the plurality of SGE security service managers includes a SGE security configuration manager that is configured to facilitate a security service that assesses security vulnerabilities of the SGE based on a current security configuration of the SGE.

In one example of the system, one of the plurality of SGE security service managers includes a network traffic security analysis manager that is configured to facilitate a security service that assesses security vulnerabilities of the SGE based on an analysis of incoming and outgoing network traffic traversing via the SGE.

In one example of the system, one of the plurality of SGE security service managers includes an analytics security service manager that is configured to facilitate a security service that assesses security vulnerabilities of the SGE through systematic analysis of data and statistics collected from the SGE under operation.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for utilizing a security service engine (SSE) to assess security vulnerabilities on a security gateway element (SGE) are disclosed. In some embodiments, the disclosed subject matter includes a security gateway element, such as session border controller, that is provisioned with a security intelligence engine that provides a security service that is configured to evaluate a security configuration of the security gateway element as well as assigning a security score corresponding to the security configuration. The security intelligence engine can also be configured to issue a report or alert in the event a weak security configuration is detected. The security intelligence engine is further configured to collect version information corresponding to any third-party software that is provisioned on the security gateway element. After obtaining diversion data, the security gateway element can verify if there are any security vulnerabilities associated with currently provisioned software application(s).

In some embodiments, a third-party software database can be built and maintained on a third-party services server. Notably, the security service engine can be configured to check if there is any new security concern or issue regarding its provision software applications. For example, the security service engine can be configured to periodically send a query message that contains version information of its provision software applications to the oracle server. In some embodiments, the query message can be sent in response to a new software application that is provisioned on the security gateway element.

The security service engine can also be configured to conduct dynamic traffic flow control by inspecting network traffic packets that are received either from a trusted domain or an untrusted domain. In particular, the security service engine is able to determine whether the network traffic that is traversing the security gateway element is suspicious or malicious. Depending on the security policy corresponding to the provision security configuration, the security service engine is able to conduct dynamic control changes that enable the blocking of any malicious network traffic. The security service engine is also able to report the presence of any detected suspicious traffic and to make security configuration recommendations that can improve network traffic control at the security gateway element. In addition, the security service engine can be configured to directly communicate with any new fraud and threat detection technologies in order to improve its traffic control capabilities.

Figure 1:
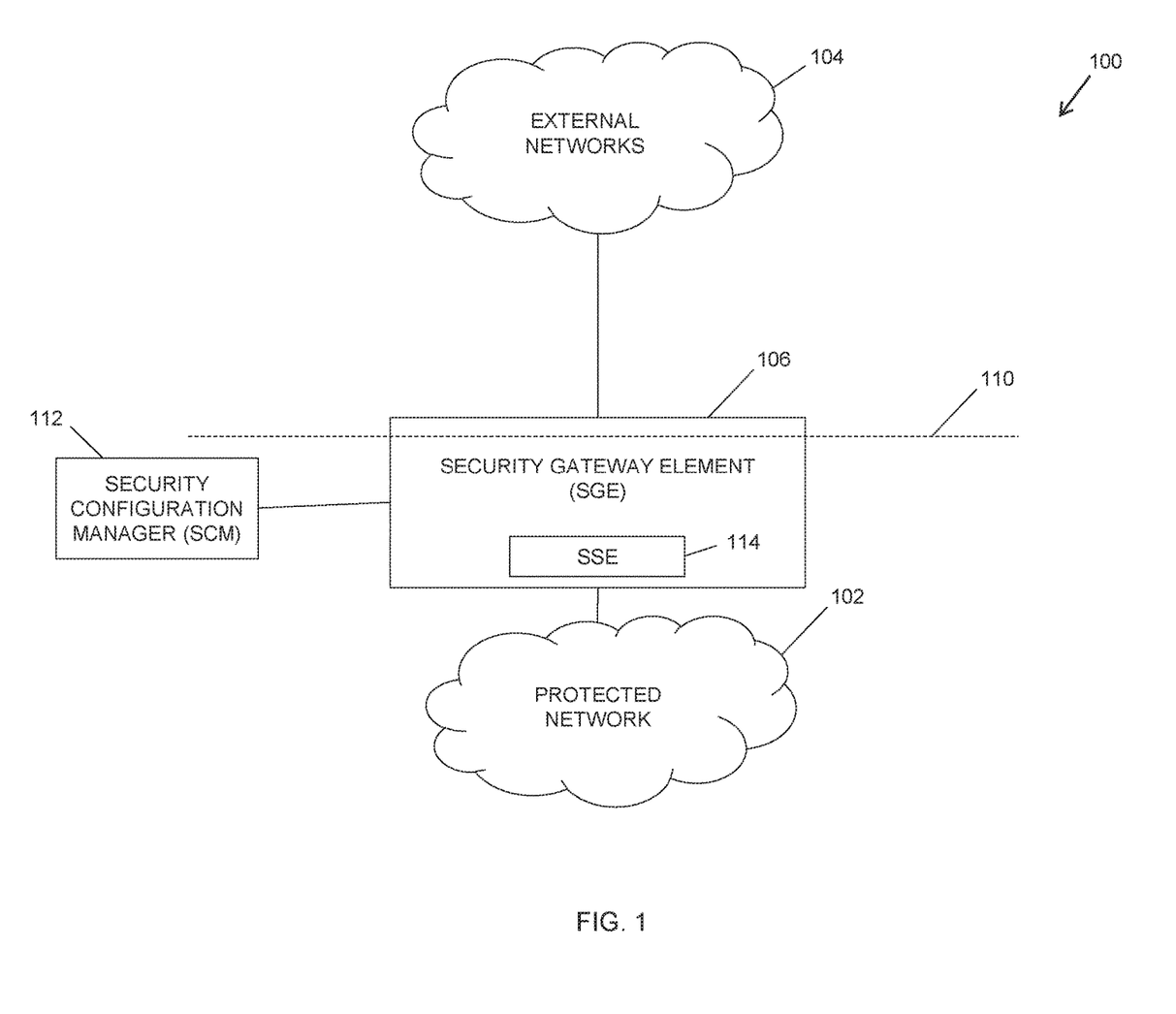
FIG. 1 is a block diagram illustrating an exemplary network for utilizing a security service engine to assess security vulnerabilities on a security gateway element according to an embodiment of the subject matter described herein.

FIG. 1 is a block diagram illustrating an exemplary network communications environment 100 that is configured to facilitate the communication of network traffic flows (e.g., packet and/or frame traffic) among its network nodes. As shown in FIG. 1, a top portion of network communications environment 100 includes one or more external networks 104 that can be characterized as an untrusted domain. Further, the bottom portion of network communications environment 100 includes a trusted domain that comprises a protected network 102, which may include an enterprise network and/or a plurality of hosted service applications. As used herein, a trusted network is a network that is supported and monitored by a security gateway element (SGE) 106, such that network traffic communications originating from the protected network 102 and/or the trusted domain are largely considered to be reliable and/or uncompromised. Notably, protected network 102 and the trusted domain are logically separated from external networks 104 by a secure boundary 110 that is implemented by SGE 106.

As shown in FIG. 1, SGE 106 is positioned at a network edge that may coincide with secure boundary 110 and provides security support to protected network 102. In some embodiments, SGE 106 may include a physical security gateway device (e.g., a secure Internet gateway), firewall device, a virtual private network (VPN) server, a session border controller (SBC), or the like. Similarly, SGE 106 may be embodied as a software based function configured to perform network traffic security gateway functions, firewall functions, secure Internet gateway functions, SBC functions, or VPN server functions.

As shown in FIG. 1, network communications environment 100 includes a system configuration manager (SCM) 112 that is communicatively connected to SGE 106. In some embodiments, system configuration manager 112 can be used by a system administrator as a user interface means to access and/or manage the security service configuration of SGE 106. System configuration manager 112 may also be adapted to receive security policies from a system administrator and subsequently generate a corresponding security service policy definition that is provided to and useable by SGE 106. For example, security policies defining security measures and parameters for an enterprise system (e.g., protected network 102) can initially be supplied to system configuration manager 112. System configuration manager 112 may be adapted to generate a security service policy definition, which in turn is provided to SGE 106 as input. In some embodiments, the security service policy definition may include various system configuration parameters or items that can be used to configure a security service engine (SSE) 114 on SGE 106. In some embodiments, SSE 114 comprises a software based component that adds security intelligence to SGE 106 as a service. By configuring and utilizing a plurality of hosted security service managers (as described in detail below and depicted in FIG. 2), SSE 114 can be configured to enforce security policies and/or regulations, detect security vulnerabilities, issue reports or alerts, provide guidance, and initiate remedial actions. Notably, SSE 114 and/or its hosted security service managers can function to enable SGE 106 to dynamically detect and prevent potential malicious attacks in real time during operation. As described below, the security service engine can be stored in memory and executed by one or more hardware processors on SGE 106.

Figure 2:
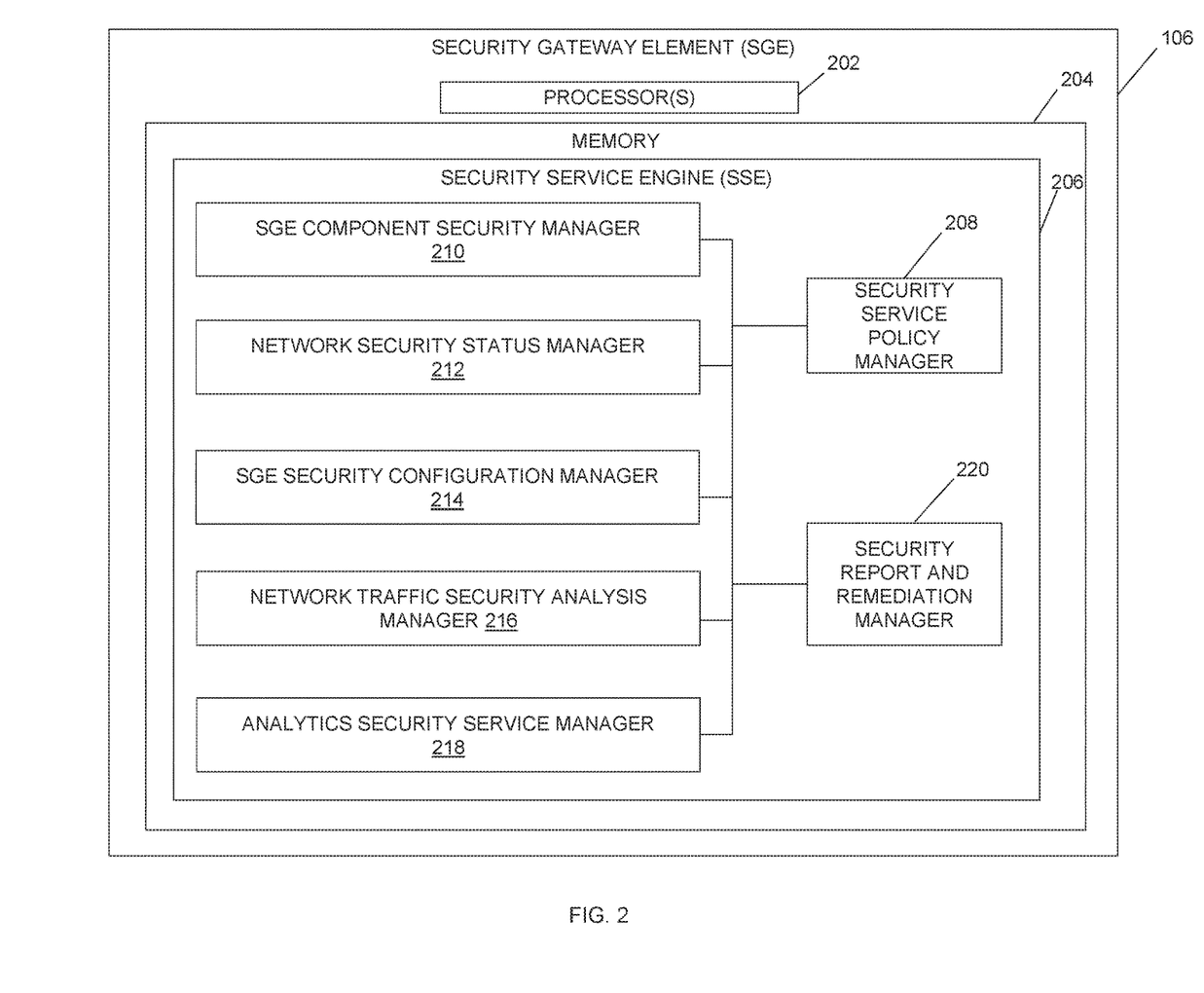
FIG. 2 is a block diagram illustrating an exemplary security gateway element provisioned with a security session engine according to an embodiment of the subject matter described herein.

FIG. 2 is a block diagram illustrating an exemplary security gateway element according to an embodiment of the subject matter described herein. As shown in FIG. 2, SGE 106 may include one or more processors 202, such as a central processing unit (e.g., a single core or multiple processing cores), a microprocessor, a microcontroller, a network processor, an application-specific integrated circuit (ASIC), or the like. SGE 106 may also include memory 204. Memory 204 may comprise random access memory (RAM), flash memory, a magnetic disk storage drive, and the like. In some embodiments, memory 204 may be configured to store a security service engine (SSE) 206 (e.g., similar to SSE 114 shown in FIG. 1). Notably, SSE 206 stored in memory 204 can perform various monitoring, management, and/or remediation functionalities for SGE 106 when executed by one or more processors 202.

In some embodiments, SSE 206 includes a security service policy manager 208 that is configured to receive service security policy definitions as input. In some embodiments, security service policy manager 208 is configured to distribute and apply the security service policy definition to a plurality of SGE security service managers 210-218 (as described below). Security service engine 206 further includes a security report and remediation manager 220 that is configured to issue an alert and/or report when SSE 206 and/or a SGE security service manager detects a security vulnerability present in SGE 106.

As disclosed herein, a security service policy definition that is received for provisioning (e.g., from a security configuration manager) can be used to define the appropriate behavior of the security services provisioned on SGE 106. For example, a security service policy definition can establish the manner in which security issues are reported and the manner in which security issues are remediated by the security report and remediation manager 220 included in SSE 206. Further, the security service policy definition can define one or more remediation actions that can be executed by manager 220 based on a security assessment conducted by the security service engine. For instance, if SSE 206 determines after using a SGE component security check manager 210 that a version of a software service application has been identified as out-of-date or presents a possible security vulnerability to SGE 106, the security service policy definition can include a software update policy that indicates that an automatic software upgrade procedure should be conducted by security report and remediation manager 220 with the security service engine.

Similarly, a security service policy definition can include network port security policies that provide a generic definition for the ports in the security gateway element as well as specific port policy definitions. In some embodiments, specific port security service policy definitions override any generic security service policy definition. Notably, these port definitions define reporting actions and remediation actions if a security assessment executed by an SGE security service manager detects a system vulnerability. For example, SSE 206 and/or security report and remediation manager 220 can report the detected security vulnerability and issue an alert to a system administrator. Such an alert can specify whether the system vulnerability is a high-risk, a medium risk, or a low risk, based upon predefined thresholds established by the particular SGE security service managers in the security service engine. The SSE 206 and/or security report and remediation manager 220 can also be configured to initiate a remediation action upon detecting the security vulnerability that includes, but is not limited to, demoting the trust level corresponding to a particular port, ceasing services associated with a detected port, and/or closing the flagged port. In some embodiments, each of the SGE security service managers includes its own separate security report and remediation manager component instead of relying on security report and remediation manager 220.

Further, the security service policy definition can include configuration security policies that can be utilized by SGE security configuration manager 214. For example, if the security service engine and/or SGE security configuration manager 214 detects a weak security configuration corresponding to SGE 106, SGE security configuration manager 214 can report that detected vulnerable configuration and issue a report or an alert to a system administrator (or instruct security report and remediation manager 220 to do so). The issued report or alert can specify whether the configuration vulnerability is a high risk, a medium risk, or a low risk. The security service engine and/or SGE security configuration manager 214 can also be configured to initiate a remediation action upon detecting the suspect configuration that includes rejecting the insecure configuration and/or reverting to a previous system configuration that was recognized as being secure.

The security service policy definition can also include real-time traffic security policies that can be utilized by a network traffic security analysis manager 216. For example, if the security service engine and/or network traffic security analysis manager 216 detects and determines that real-time network traffic traversing SGE 106 proposes a security risk, then network traffic security analysis manager 216 can issue an alert to a system administrator (or instruct manager 220 to do so). Such an alert can specify whether the real-time traffic security risk is a high-risk, a medium risk, or a low risk. Based on the degree of the detected risk, the security service engine can be configured to initiate an appropriate remediation action using manager 220. Such remediation actions can include, but are not limited to, the rejection of the network traffic at the security gateway element, demoting the trust level, ceasing service associated with the detected real-time traffic security risk, and/or closing the port servicing the detected real-time traffic.

In the description below, the functionality and operation of embodiments for each of the SGE security service managers 210-218 are described in additional detail.

Figure 3:
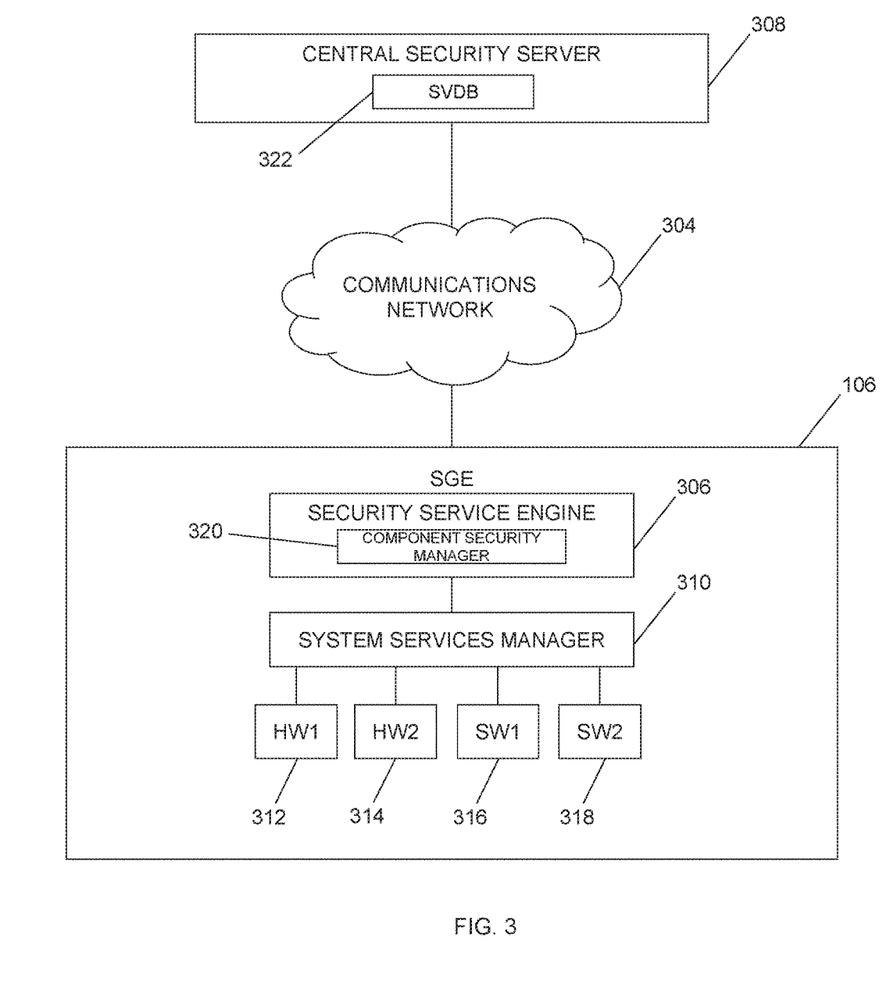
FIG. 3 is a block diagram illustrating an exemplary security gateway element communicating with a central security server according to an embodiment of the subject matter described herein.

FIG. 3 is a block diagram illustrating an exemplary security gateway element communicating with a central security server according to an embodiment of the subject matter described herein. In particular, FIG. 3 depicts a SGE 106 that is communicatively connected to a central security server 308 via communications network 304 (e.g., the Internet). In some embodiments, SGE 106 includes a security service engine 306 and an SGE system services manager 310. SGE 106 further includes hardware components 312-314, which may include any hardware based units or devices that facilitates the functionality of SGE 106, such as a central processing unit (CPU), a network interface card (NIC), and the like. Similarly, SGE 106 also comprises software components 316-318, which may include any software-based modules that facilitate the functionality of SGE 106, such as an operating system, a service application, codecs, or the like.

In some embodiments, security service engine 306 (and/or SGE component security manager 320) is configured to assess the security vulnerabilities corresponding to the hardware components and software components residing in SGE 106. Notably, security service engine 306 (and/or SGE component security manager 320) is configured to query system services manager 310 to obtain hardware component information and software component information corresponding to hardware components 312-314 and software components 316-318, respectively. For example, security service engine 306 (and/or SGE component security manager 320) may send a query message to system services manager 310 requesting pertinent hardware information (e.g., model identification numbers and/or version numbers) and software information (e.g., software, firmware, and/or driver version numbers). After obtaining this information from system services manager 310, security service engine 306 (and/or SGE component security manager 320) establishes a connection with central security server 308. In some embodiments, central security server 308 can include a session border controller security server that is configured to maintain and store one or more databases containing hardware and software identification information that is mapped to known security issues and/or common vulnerabilities and exposures (CVE) data. In the event that the hardware information and software information provided to central security server 308 matches the database entries and corresponding security vulnerability information maintained in its local database, central security server 308 is configured to issue a report specifying the security vulnerability issues pertaining to the assessed hardware and or software information to security service engine 306. In response, security service engine 306 and/or SGE component security manager 320 may then alert a system administrator of the detected system vulnerabilities associated with the hardware and/or software components. Based on the security service policy definition, security service engine 306 (and/or SGE component security manager 320) can either utilize a report and remediation manager to issue a pop-up alert or automatically download an upgrade software patch from central security server 308 (or from a third party source/server) depending on the security service policy definition included in the security configuration provisioned on SGE 106.

In some embodiments, central security server 308 includes a security vulnerabilities database (SVDB) 322 that contains various security gateway element related information. For example, security vulnerabilities database 322 can include all of the supported release version information corresponding to the hardware and software components residing on SGE 106 in the network. For each version of hardware or software component, security vulnerabilities database 322 includes all of the third-party software component name information and version information. Further, for each version of software or hardware component, security vulnerabilities database 322 contains security policy information, such as recommended security cipher configuration data. In addition, security vulnerabilities database 322 includes a package that contains known security vulnerability information that is mapped to each hardware and software version. Further, for each third-party component, security vulnerabilities database 322 contains all known third party CVE information.

Returning to FIG. 2, security service engine 206 is configured to utilize a network security status manager 212 to assess and monitor the security levels at the ports and communication interfaces of SGE 106. For example, network security status manager 212 can be configured to detect non-secure port protocols and parameters as well as to determine if a port should be opened or closed. Further, network security status manager 212 can also be configured to detect if an application or service is assigned or utilizing the correct port of SGE 106. Similarly, the network security status manager 212 can determine if that service or application is running in a secure manner on the correct port. In the event that security service engine 206 detects any of the above security vulnerabilities, security service engine 206 is configured to execute manager 220 to initiate a remedial action to secure SGE 106.

Figure 4:
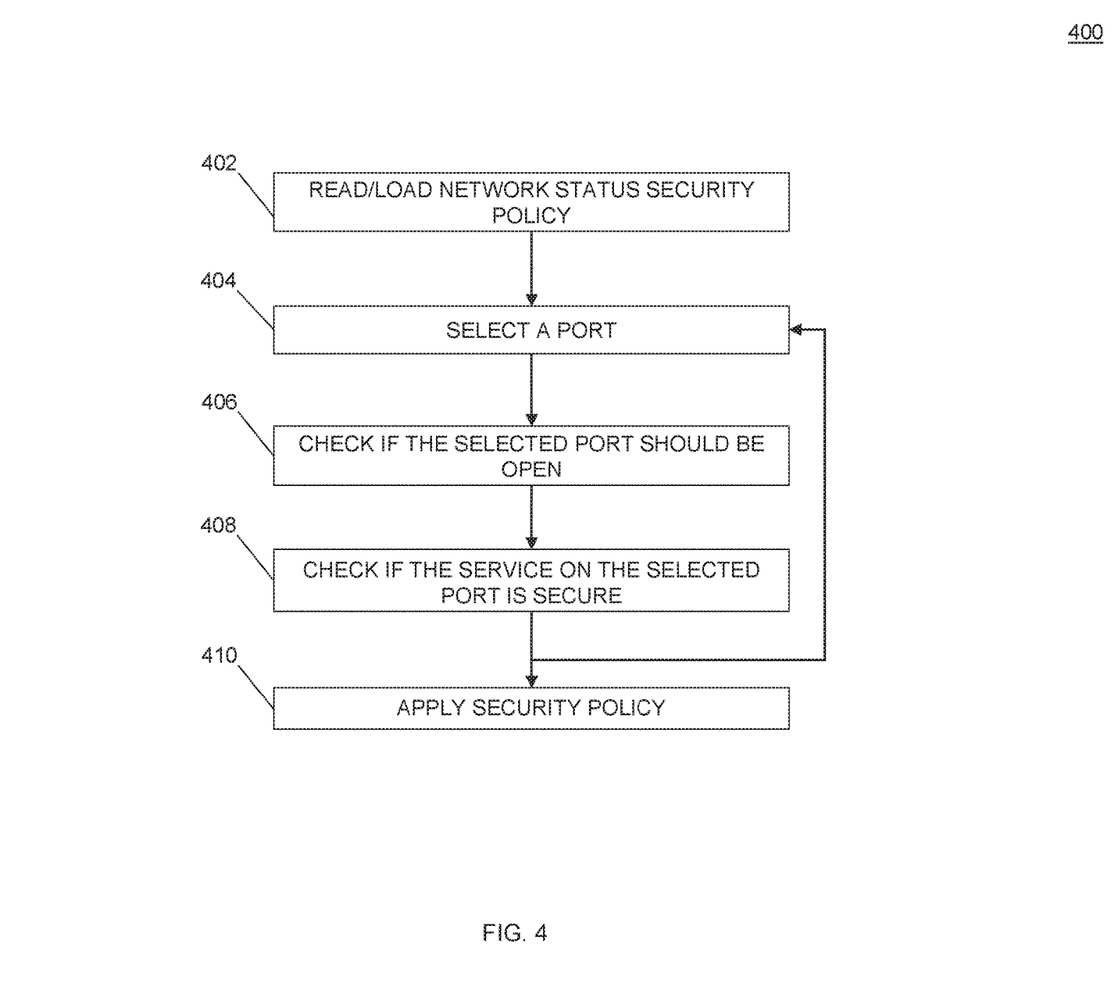
FIG. 4 is a flow chart illustrating an exemplary network status security service process according to an embodiment of the subject matter described herein.

FIG. 4 is a flow chart illustrating an exemplary network status security service process according to an embodiment of the subject matter described herein. In some embodiments, method 400 as depicted in FIG. 4 is an algorithm executed by network security status manager 212 of SSE 206 and is stored in memory and, when executed by a hardware processor of SGE 106, performs one or more of blocks 402-410. For example, in FIG. 4, security service engine 206 is configured to read and load a network status security policy obtained from a security service policy definition (block 402). Afterwards, security service engine 206 and/or network security status manager 212 can be configured to iteratively search or loop through all of the management ports and service ports that are present on SGE 106. For example, security service engine 206 is configured to select a port and determine if that selected port is open (e.g., block 406). For example, port number '80' on a management interface should not be open since that is a hypertext transfer protocol (HTTP) port, which is not secure.

Security service engine 206 may then determine if the service or application communicated on the selected port is secure. For example, security service engine 206 and/or network security status manager 212 can check if the service on the selected port is correct and determine whether the service is running securely on the selected port (block 408). For example, security service engine 206 and/or network security status manager 212 can detect a cipher that is not recommended for communication on port '443', which is an HTTPS/TLS port on the security gateway element. The security service engine 206 and/or network security status manager 212 proceeds to apply a security policy in block 410. In some embodiments, security service engine 206 and/or network security status manager 212 executes a remedial action (e.g., using manager 220) that is as defined by the security service policy definition configured SGE 106. In some embodiments, security service engine 206 and/or network security status manager 212 may also be configured to use security report and remediation manager 220 to report the detected security vulnerability, issue an alert that further advises a solution, and/or execute the appropriate remedial action based on the security vulnerability findings. Remedial actions executed by the security service engine on the selected port can include, but not limited to, stopping the communication of the service on the selected port and/or closing the selected port itself, if necessary.

Figure 5:
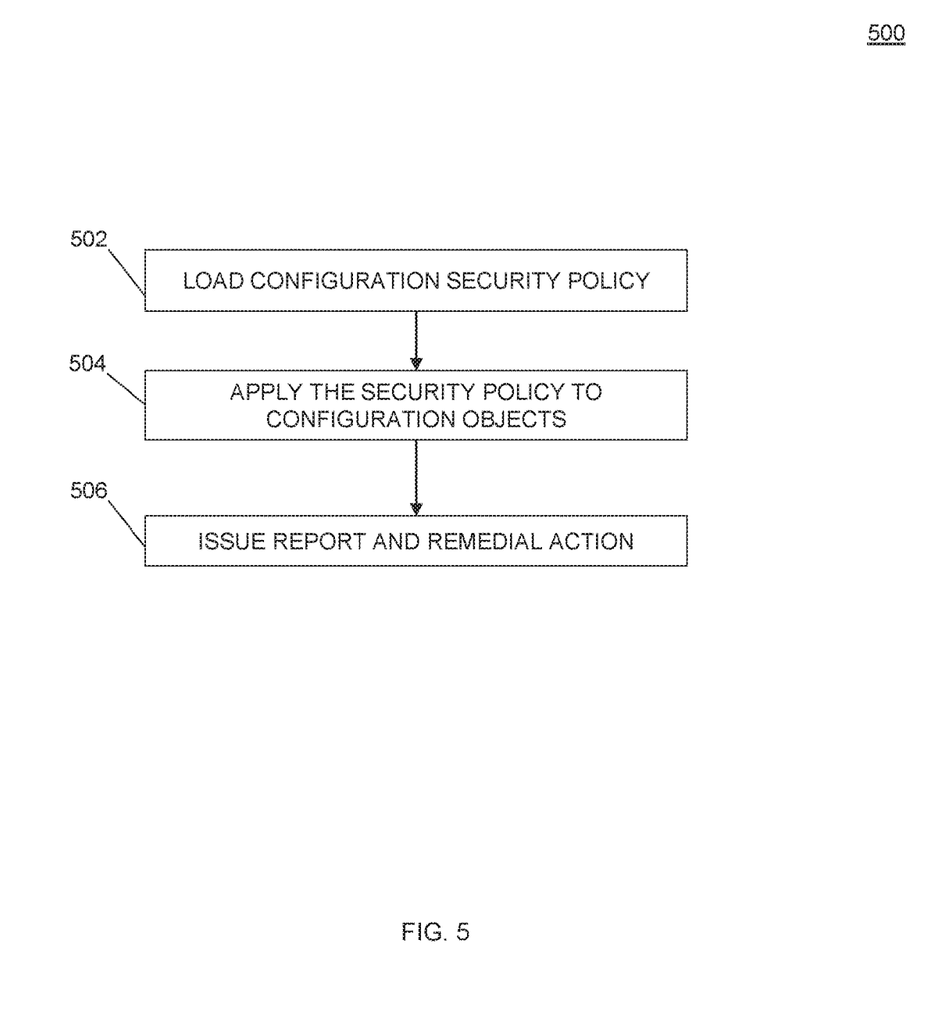
FIG. 5 is a flow chart illustrating an exemplary secure configuration service process according to an embodiment of the subject matter described herein.

In some embodiments, security service engine 206 is configured to utilize a SGE security configuration manager 214 to monitor and assess the security configuration of a security gateway element. In some embodiments, SGE security configuration manager 214 is configured to ensure that SGE 106 is in a secure configuration. FIG. 5 is a flow chart illustrating an exemplary secure configuration service process according to an embodiment of the subject matter described herein. In some embodiments, method 500 as depicted in FIG. 5 represents an algorithm executed by a SGE security configuration manager 214 of SSE 206 that is stored in memory and, when executed by a hardware processor of SGE 106, performs one or more of blocks 502-506. In some embodiments, SGE security configuration manager 214 is adapted to initially load a configuration security policy on an security gateway element (block 502). In block 504, the security configuration manager is adapted to initiate communications with the management interface of SGE 106. In particular, security configuration manager 214 queries the management interface to determine if the SSH configuration is secure and determine if the HTTPS/TLS configuration is secure. In addition, SGE security configure manager 214 is adapted to initiate communication with the signaling interface of SGE 106 to determine if the TLS configuration is secure as well as ascertaining if the IPSec/IKE configuration is secure. Likewise, SGE security configuration manager 214 can also initiate communication with the media interface of SGE 106. In such an instance, SGE security configuration manager 214 can send a query to the media interface to determine if the Secure Real-Time Transport Protocol (SRTP) configuration is secure. Moreover, SGE security configuration manager 214 can initiate system wide checks to determine if the ciphers utilized by SGE 106 are secure.

In block 506, SGE security configuration manager 214 is configured to issue reports and/or initiate remedial actions. For example, SGE security configuration manager 214 can issue a report detailing a detected unsecured configuration and provide a recommendation regarding the correct security configuration for the interface and/or SGE 106. Additional remedial actions that can be executed by SGE security configuration manager 214 and/or security report and remediation manager 220 include the rejection of a non-secure security configuration or the initiation of an automated repair for a non-secure security configuration on SGE 106.

Figure 6:
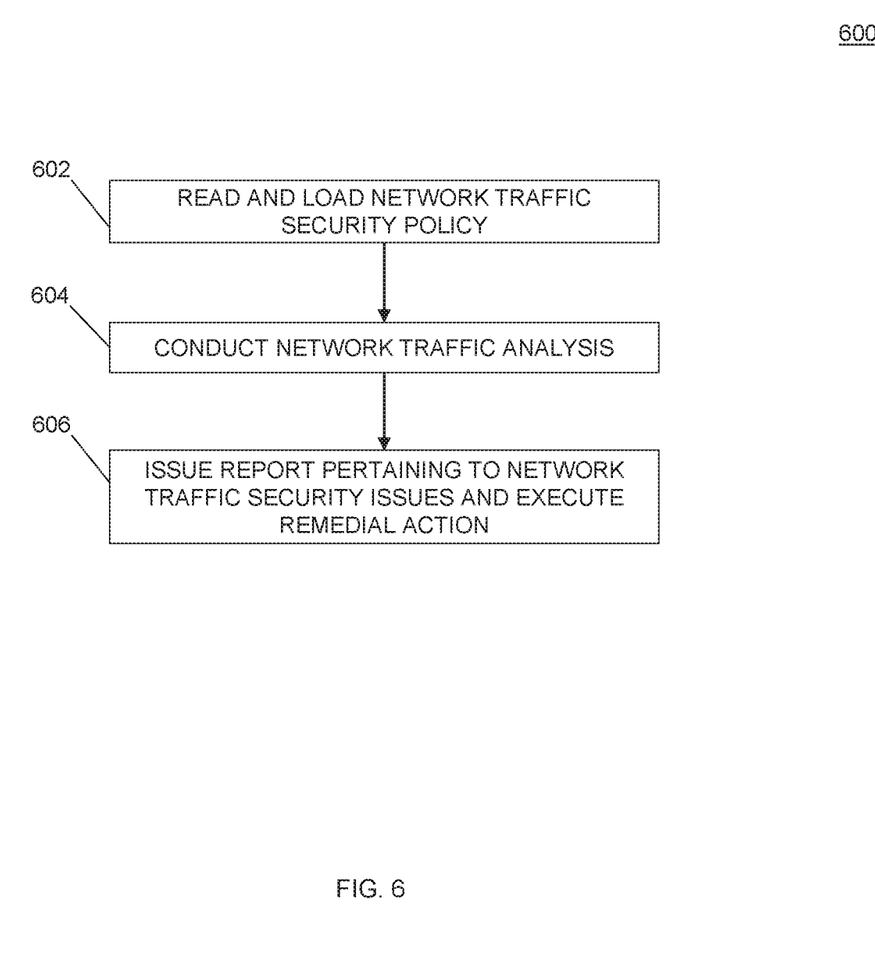
FIG. 6 is a flow chart illustrating an exemplary real traffic security analysis service process according to an embodiment of the subject matter described herein.

In some embodiments, security service engine 206 is configured to utilize a network traffic security analysis manager 216 to monitor and assess security vulnerabilities attributed to the network traffic flows that traverse a secure gateway entity. In some embodiments, SSE 206 and/or network traffic security analysis manager 216 is configured to assess the network traffic security of the SGE 106. For example, network traffic security analysis manager 216 can be configured to utilize by existing call analysis methods, such as session initiation protocol (SIP) and call admission control (CAC), to conduct an assessment of the network traffic security existing at SGE 106. FIG. 6 is a flow chart illustrating an exemplary real traffic security analysis service process according to an embodiment of the subject matter described herein. In some embodiments, method 600 as depicted in FIG. 6 represents an algorithm executed by a network traffic security analysis manager 216 of SSE 206 that is stored in memory and, when executed by a hardware processor of SGE 106, performs one or more of blocks 602-606. As shown in block 602 of FIG. 6, the network traffic security analysis manager is configured to read and load a traffic security service policy definition that is provided to a security gateway element. In block 604, the network traffic security analysis manager 216 is adapted to apply network traffic analysis. As indicated above, network traffic security analysis manager 216 can be configured to utilize call analysis methods using protocols such as SIP and CAC. In some embodiments, network traffic security analysis manager 216 is configured to conduct a network traffic analysis on both incoming network traffic and outgoing network traffic using legitimate headers (e.g., a header that is supported by a particular protocol and that is in a correct format, such as correct/consistent type/value and header length).

In block 606, network traffic security analysis manager 216 is configured to issue reports and recommend remedial actions. For example, network traffic security analysis manager 216 can instruct security report and remediation manager 220 to issue a report that specifies the security vulnerabilities identified by network traffic security analysis manager 216 and provide a recommendation regarding the correct security configuration for SGE 106. In some embodiments, network traffic security analysis manager 216 and/or security report and remediation manager 220 is configured to automatically reject network traffic packets in the event that the maximum network traffic bandwidth (e.g., bytes/second) that SGE 106 is configured to handle has been reached or exceeded. Additional remedial actions that can be executed by the network traffic security analysis manager 216 and/or security report and remediation manager 220 include the rejection of calls and/or the ceasing of certain network packet traffic.

Figure 7:
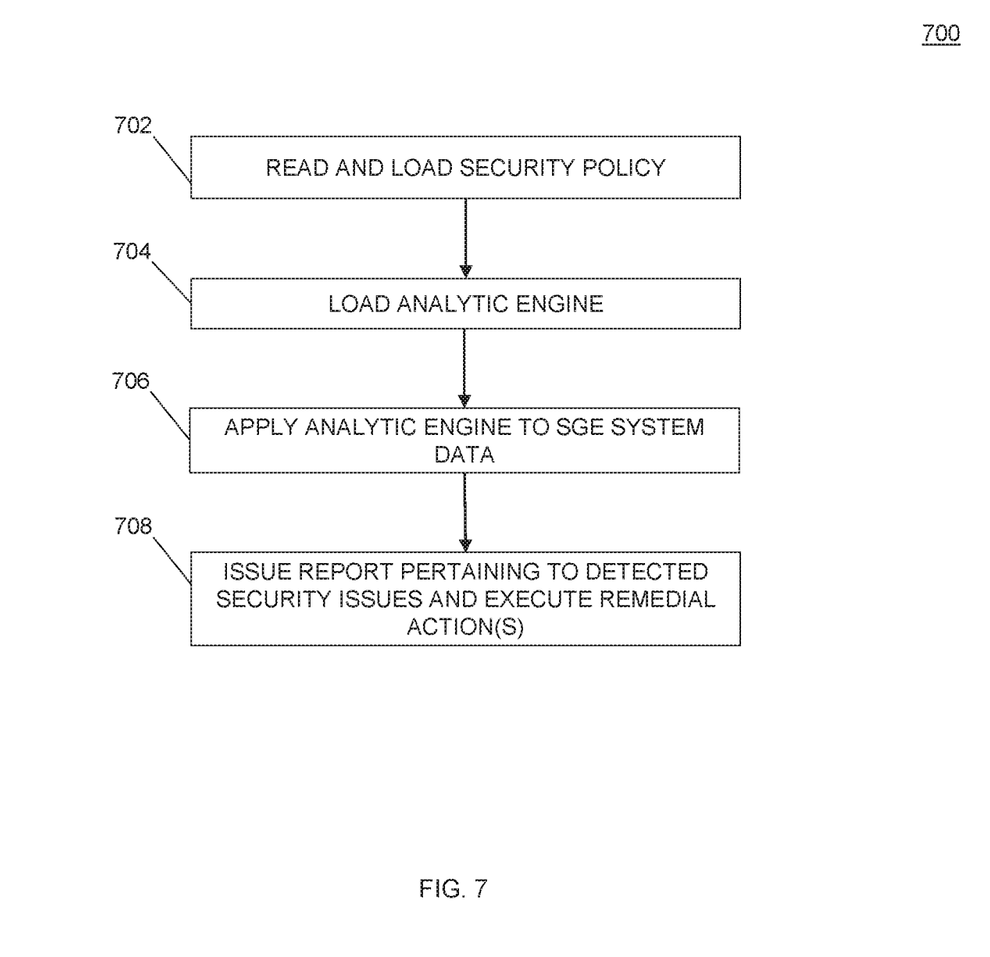
FIG. 7 is a flow chart illustrating an exemplary analytic security service process according to an embodiment of the subject matter described herein.

In some embodiments, security service engine 206 is configured to utilize an analytics security service manager 218 to monitor and assess security vulnerabilities using collected data and statistics. More specifically, analytics security service manager 218 is configured to intelligently conduct a security assessment of the security gateway element through a systematic analysis of data and statistics collected from the operating SGE 106. In some embodiments, analytics security service manager 218 is configured to analyze SGE statistics (e.g., SIP statistics, packet flow statistics, and the like) collected by components and interfaces of the SGE 106, system logs recorded by SGE 106 controller, call detail records (CDRs) generated by SGE 106, simple network management protocol (SNMP) traps and alerts detected by SGE 106, historical data records (HDRs) generated by SGE 106, and the like. FIG. 7 is a flow chart illustrating an exemplary analytic security service process according to an embodiment of the subject matter described herein. In some embodiments, method 700 as depicted in FIG. 7 represents an algorithm executed by an analytics security service manager 218 of SSE 206 that is stored in memory and, when executed by a hardware processor of SGE 106, performs one or more of blocks 702-708. As shown in block 702 of FIG. 7, analytics security service manager 218 is configured to read and load all of the security service policy definitions as the analytic can be a configuration security, a network status security, and the like. In block 704, analytics security service manager 218 can be configured to load and execute an analytics engine, which in some embodiments comprises a script grep for certain system logs. In block 706, analytics security service manager 218 can be configured to apply the analytics engine to the aforementioned SGE system data such as, SIP statistics, packet statistics, system logs, CDRs, SNMP alerts, and the like. After applying the analytics engine to the SGE system data, the analytics security service manager 218 is adapted to determine if any system vulnerabilities exist. In block 708, analytics security service manager 218 is configured to issue a report and remedial action. For example, the analytics security service manager 218 can instruct security report and remediation manager 220 to report a detected security issue and issue an alert that sent to a system administrator. Security report and remediation manager 220 may also be instructed to provide a recommended solution to the detected security issue and execute a remedial action to address the detected security vulnerability on behalf of analytics security service manager 218. In some embodiments, the remedial actions conducted by Security report and remediation manager 220 and/or analytics security service manager 218 include closing a port, ceasing services provided via a port, changing a particular trust level, rejecting a configuration, automatically changing a configuration, and/or the like.

Figure 8:
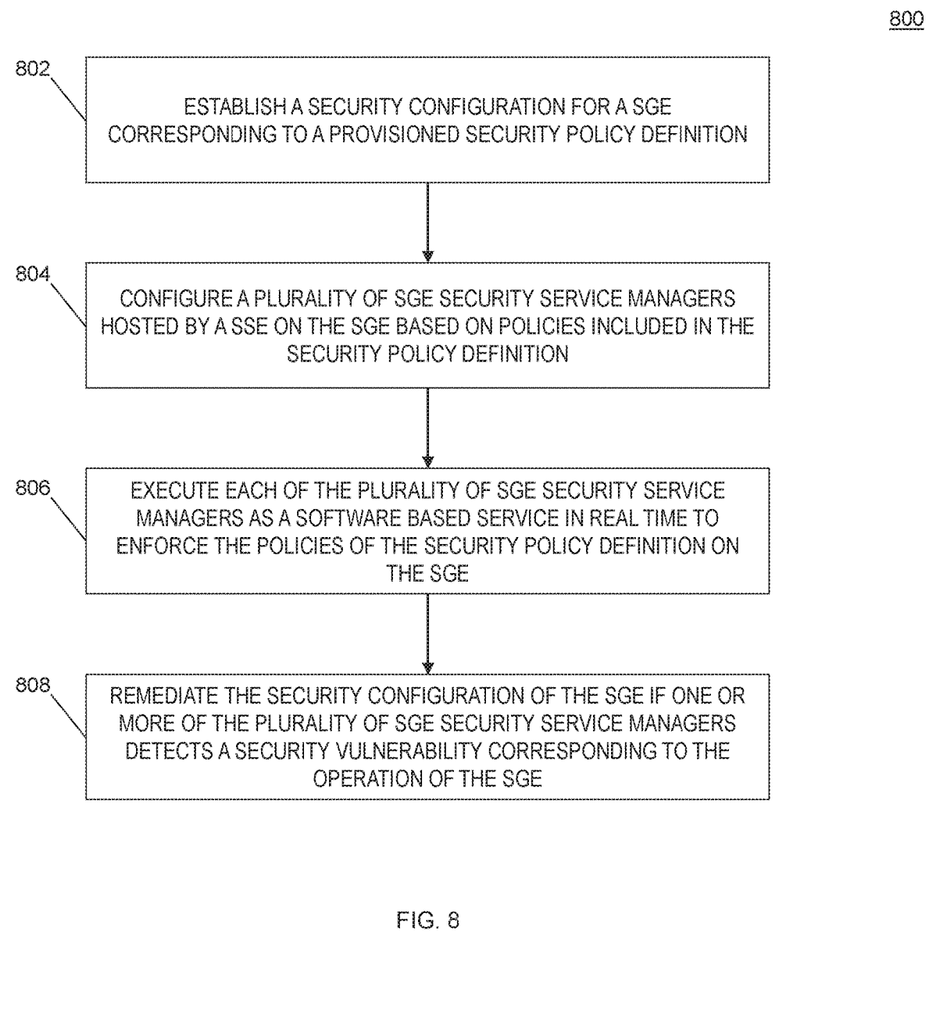
FIG. 8 is a flow chart illustrating an exemplary process for utilizing a security service engine to assess security vulnerabilities on a security gateway element according to an embodiment of the subject matter described herein.

FIG. 8 is a flow chart illustrating an exemplary process or method 800 for utilizing a security service engine to assess security vulnerabilities on a security gateway element according to an embodiment of the subject matter described herein. In some embodiments, method 800 as depicted in FIG. 8 is an algorithm stored in memory that when executed by a hardware processor performs one or more of blocks 802-808.

In block 802, a security configuration for a security gateway element (SGE) corresponding to a provisioned security service policy definition is established. In some embodiments, a system administrator provisions a security service policy definition onto the security gateway element via a user interface manager. For example, the security service engine can receive the security service policy definition and establish a security configuration for the security gateway element.

In block 804, a plurality of SGE security service managers hosted by the service security engine on the SGE is configured based on policies included in the security service policy definition. In some embodiments, the security service engine is adapted to assess the policies defined in the security service policy definition to establish and/or update a plurality of SGE security service managers hosted by the security service engine. For example, the security service engine can utilize the policies of the security service policy definition to configure a SGE component security check manager, a network security status manager, a SGE security configuration manager, a network traffic security analysis manager, and the analytics security service manager hosted by the security service engine.

In block 806, each of the plurality of SGE security service managers is executed by the SSE as a software based service in real time to enforce the policies of the security service policy definition on the SGE. In some embodiments, the security service engine is configured to operate on the security gateway element in real time. In particular, the security service engine executes each of the SGE security service managers described above in order to monitor, detect, and prevent potential malicious attacks directed to the security gateway element.

In block 808, the security configuration of the SGE is remediated if one or more of the plurality of SGE security service managers detects a security vulnerability corresponding to the operation of the SGE. In some embodiments, at least one of the security service managers conducts a security assessment on the security gateway element and subsequently detects a system vulnerability in real time. In response to the detected system vulnerability, the security service engine is adapted to initiate a remediation action and/or issue a report. In some embodiments, the security service engine can utilize its security report manager to generate a report message that is sent to a system administrator in order to alert of the detected system vulnerability. In some embodiments, each of the security service managers includes its own security report manager that is configured to issue the reporting action. Likewise, the security service engine is configured to initiate the appropriate remedial action based on the detected security vulnerability.

Advantages of the subject matter described herein include implementing security intelligence into a security gateway element, such as a session border controller, as a service (e.g., software as a service) executed by a security service engine. As such, the security service engine is able to enforce security policies and regulations, issue remediation guidance, and to dynamically detect and prevent potential malicious attacks at run time. Instead of relying on traditional security configuration guides and manually checking hardware and software components, a security gateway element can be assessed, monitored, and remediated in an automated manner when supported by the disclosed security service engine. Notably, the described monitoring and remediation techniques increases the rate at which changes to a security gateway element can be implemented. In addition, such a measure ensures that the security gateway element is assessed for security vulnerabilities in real-time. This can have an enormous impact on the cost of securing an enterprise network supported by the security gateway element as well as the damage inflicted by undetected security breaches. Thus, a security gateway element configured to dynamically remedy itself in such a manner is able to respond to identified security vulnerabilities and/or prevent potential malicious attacks as described herein improves the technological field of computer network security by reducing the likelihood of breaches on computer networks in a more efficient manner.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   establishing a security configuration for a security gateway element (SGE) corresponding to a provisioned security service policy definition;
   configuring a plurality of SGE security service managers hosted by a service security engine (SSE) on the SGE based on policies included in the security service policy definition;
   executing, by the SSE, each of the plurality of SGE security service managers as a software based service in real time to enforce the policies of the security service policy definition on the SGE; and
   remediating the security configuration of the SGE if one or more of the plurality of SGE security service managers detects a security vulnerability corresponding to an operation of the SGE,
   wherein remediating the security configuration includes automatically rejecting network traffic packets in an event that a maximum network traffic bandwidth that the SGE is configured to handle is reached or exceeded.

2. The method of claim 1 wherein the SGE includes a session border controller (SBC), a firewall, a Web service gateway, or a virtual private network (VPN) server.

3. The method of claim 1 wherein one of the plurality of SGE security service managers includes a SGE component security manager that is configured to facilitate a security service that assesses security vulnerabilities of the SGE based on hardware component information and software component information obtained from the SGE.

4. The method of claim 1 wherein one of the plurality of SGE security service managers includes a network security status manager that is configured to facilitate a security service that assesses security vulnerabilities of management ports and service ports of the SGE.

5. The method of claim 1 wherein one of the plurality of SGE security service managers includes a SGE security configuration manager that is configured to facilitate a security service that assesses security vulnerabilities of the SGE based on a current security configuration of the SGE.

6. The method of claim 1 wherein one of the plurality of SGE security service managers includes a network traffic security analysis manager that is configured to facilitate a security service that assesses security vulnerabilities of the SGE based on an analysis of incoming and outgoing network traffic traversing via the SGE.

7. The method of claim 1 wherein one of the plurality of SGE security service managers includes an analytics security service manager that is configured to facilitate a security service that assesses security vulnerabilities of the SGE through systematic analysis of data and statistics collected from the SGE under operation.

8. A system comprising:
   a session gateway element (SGE) comprising at least one processor and memory; and
   a security service engine (SSE) stored in the memory and when executed by the at least one processor is configured to establish a security configuration for the SGE corresponding to a provisioned security service policy definition, to configure a plurality of SGE security service managers hosted by the SSE based on policies included in the security service policy definition, to execute each of the plurality of SGE security service managers as a software based service in real time to enforce the policies of the security service policy definition on the SGE, and to remediate the security configuration of the SGE if one or more of the plurality of SGE security service managers detects a security vulnerability corresponding to an operation of the SGE
   wherein remediating the security configuration includes automatically rejecting network traffic packets in an event that a maximum network traffic bandwidth that the SGE is configured to handle is reached or exceeded.

9. The system of claim 8 wherein the SGE includes a session border controller (SBC), a firewall, a Web service gateway, or a virtual private network (VPN) server.

10. The system of claim 8 wherein one of the plurality of SGE security service managers includes a SGE component security manager that is configured to facilitate a security service that assesses security vulnerabilities of the SGE based on hardware component information and software component information obtained from the SGE.

11. The system of claim 8 wherein one of the plurality of SGE security service managers includes a network security status manager that is configured to facilitate a security service that assesses security vulnerabilities of management ports and service ports of the SGE.

12. The system of claim 8 wherein one of the plurality of SGE security service managers includes a SGE security configuration manager that is configured to facilitate a security service that assesses security vulnerabilities of the SGE based on a current security configuration of the SGE.

13. The system of claim 8 wherein one of the plurality of SGE security service managers includes a network traffic security analysis manager that is configured to facilitate a security service that assesses security vulnerabilities of the SGE based on an analysis of incoming and outgoing network traffic traversing via the SGE.

14. The system of claim 8 wherein one of the plurality of SGE security service managers includes an analytics security service manager that is configured to facilitate a security service that assesses security vulnerabilities of the SGE through systematic analysis of data and statistics collected from the SGE under operation.

15. A non-transitory computer readable medium having stored thereon executable instructions that when executed by a processor of a computer controls the computer to perform steps comprising:
   establishing a security configuration for a security gateway element (SGE) corresponding to a provisioned security service policy definition;
   configuring a plurality of SGE security service managers hosted by a service security engine (SSE) on the SGE based on policies included in the security service policy definition;
   executing, by the SSE, each of the plurality of SGE security service managers as a software based service in real time to enforce the policies of the security service policy definition on the SGE; and
   remediating the security configuration of the SGE if one or more of the plurality of SGE security service managers detects a security vulnerability corresponding to an operation of the SGE wherein remediating the security configuration includes automatically rejecting network traffic packets in an event that a maximum network traffic bandwidth that the SGE is configured to handle is reached or exceeded.

16. The non-transitory computer readable medium of claim 15 wherein one of the plurality of SGE security service managers includes a SGE component security manager that is configured to facilitate a security service that assesses security vulnerabilities of the SGE based on hardware component information and software component information obtained from the SGE.

17. The non-transitory computer readable medium of claim 15 wherein one of the plurality of SGE security service managers includes a network security status manager that is configured to facilitate a security service that assesses security vulnerabilities of management ports and service ports of the SGE.

18. The non-transitory computer readable medium of claim 15 wherein one of the plurality of SGE security service managers includes a SGE security configuration manager that is configured to facilitate a security service that assesses security vulnerabilities of the SGE based on a current security configuration of the SGE.

19. The non-transitory computer readable medium of claim 15 wherein one of the plurality of SGE security service managers includes a network traffic security analysis manager that is configured to facilitate a security service that assesses security vulnerabilities of the SGE based on an analysis of incoming and outgoing network traffic traversing via the SGE.

20. The non-transitory computer readable medium of claim 15 wherein one of the plurality of SGE security service managers includes an analytics security service manager that is configured to facilitate a security service that assesses security vulnerabilities of the SGE through systematic analysis of data and statistics collected from the SGE under operation.

* * * * *